United States Patent [19]
Vatti et al.

[11] Patent Number: 5,375,196
[45] Date of Patent: Dec. 20, 1994

[54] RAPID LINE DRAWING IN COMPUTER GRAPHICS EMPLOYING FLOATING-POINT ARITHMETIC

[75] Inventors: Bala R. Vatti, Hudson; Mark R. Duckworth, Londonderry; Robert L. Hammond, Nashua, all of N.H.

[73] Assignee: CalComp Inc., Anaheim, Calif.

[21] Appl. No.: 40,079

[22] Filed: Mar. 30, 1993

Related U.S. Application Data

[63] Continuation of Ser. No. 634,730, Dec. 27, 1990, abandoned.

[51] Int. Cl.$^5$ .............................................. G06F 15/62
[52] U.S. Cl. ................................. 395/143; 395/128; 395/131; 395/133
[58] Field of Search ................... 395/118-122, 395/140-143, 128-131, 132, 133, 136

[56] References Cited

U.S. PATENT DOCUMENTS

| | | | |
|---|---|---|---|
| 4,878,182 | 10/1989 | Aranda et al. | 395/143 |
| 4,924,415 | 5/1990 | Winser | 395/122 |
| 5,185,599 | 2/1993 | Doornink et al. | 395/143 |

*Primary Examiner*—Almis Jankus
*Attorney, Agent, or Firm*—Robert G. Crooks

[57] ABSTRACT

Three terms (X,Y,"Error") are combined in a single floating-point number in an advanced microprocessor to compute pixel addresses. The floating-point number is reconverted to integer form in multiplexers operating in a mode determined by slope, relative to unity, of the line to be defined by the pixels. The output of the multiplexers is enhanced by a look-up table to produce color data, which are converted to analog form for display. Speed of operation is greatly augmented by the use of floating-point arithmetic to compute the pixel addresses.

6 Claims, 3 Drawing Sheets

APPARATUS BLOCK DIAGRAM

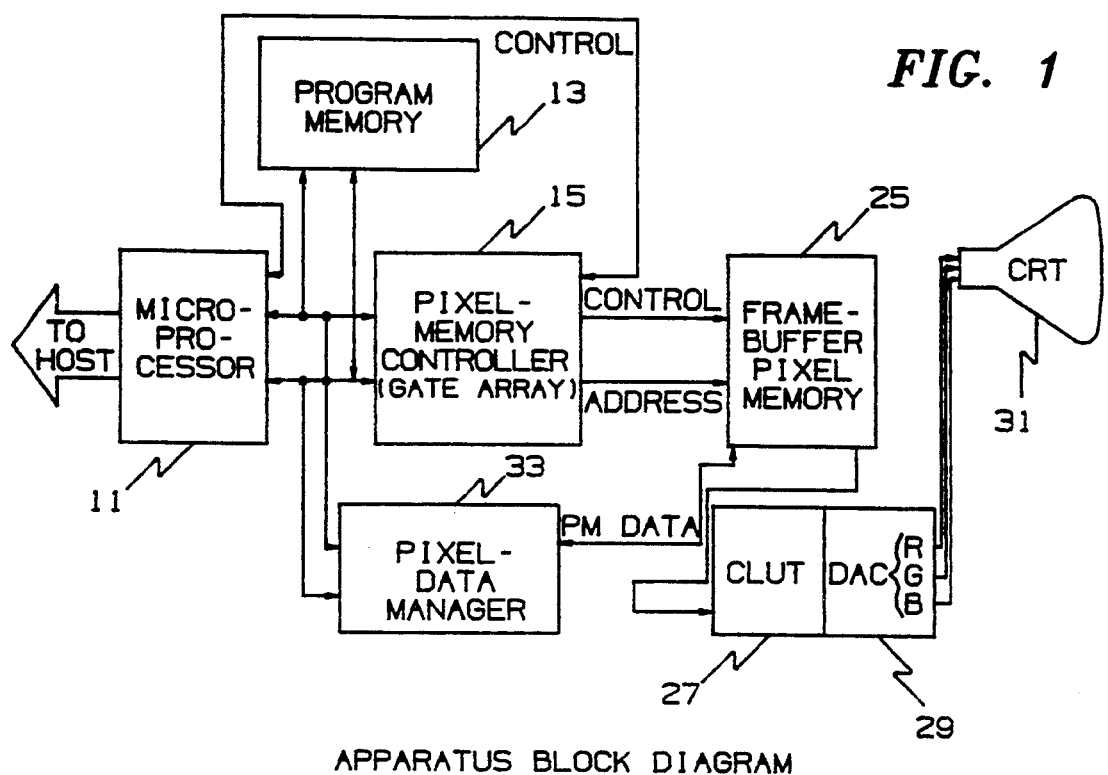
APPARATUS BLOCK DIAGRAM
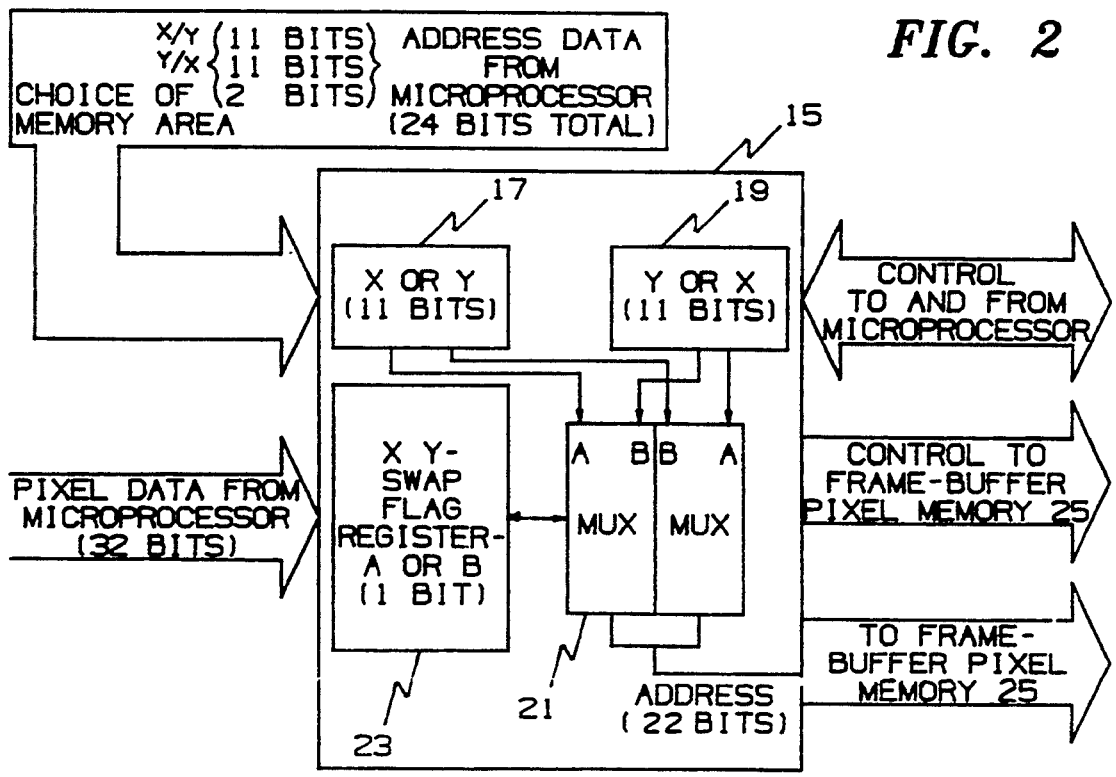
PIXEL-MEMORY CONTROLLER (GATE ARRAY) 15

FIG. 3

PRIOR ART

```
For i = 0 to N do;
    Draw_Pixel (X,Y,Color);
    if (Error >(0) do;
        Error = Error + Del Error 1
        Y = Y + 1;
        End;
    Else do;
        Error = Error + Del Error 2
        End;
    X = X + 1
End;
```

FIG. 4

```
For i = 0 to N do;
    Draw_Pixel (I coordinate,Color);
    F coordinate = F coordinate + Del F coordinate;
    I coordinate = FIX (F coordinate);
End;
```

Wherein :

I coordinate is the integer coordinate of the pixel being rendered;
F coordinate is I coordinate in floating-point format;
Del F coordinate is the floating-point delta value needed to compute the address of the next pixel;
Color is the color (hue) to be used in the pixel;
Draw_Pixel draws a pixel at I coordinate using Color; and
FIX converts a floating-point value to integer format.

FIG. 5

Assuming SCREEN_X = SCREEN_Y = 2 power N

Form of I coordinate is :

| Y coordinate | X coordinate |
|---|---|
| ←—N high bits—→ | ←—N low bits—→ |

FIG. 6

For Absolute Magnitude of Slope < 1 :

| X (Integer) | Y (Integer) | Y (Fraction) |
|---|---|---|
|  | + |  |
| Del X (Integer) | Del Y (Integer) | Del Y (Fraction) |

(All Floating-Point Numbers)

Sum Is Address of Next Pixel

FIG. 7

For Absolute Magnitude of Slope > 1 :

| Y (Integer) | X (Integer) | X (Fraction) |
|---|---|---|
|  | + |  |
| Del Y (Integer) | Del X (Integer) | Del X (Fraction) |

(All Floating-Point Numbers)

Sum Is Address of Next Pixel

RAPID LINE DRAWING IN COMPUTER GRAPHICS EMPLOYING FLOATING-POINT ARITHMETIC

This is a continuation of copending application Ser. No. 07/634,730 filed on Dec. 27, 1990, now abandoned.

This invention relates to a method and apparatus for drawing lines in the displays of computers that have graphic outputs. Such graphic outputs often incorporate color-cathode-ray-tube displays. These computers and displays are useful in the technologies of computer-aided design ("CAD") and computer-aided manufacturing ("CAM").

BACKGROUND OF THE INVENTION

Computer graphics is a rapidly-developing and increasingly-important art. It provides one of the essential elements of the technologies commonly referred to as "computer-aided design" and "computer-aided manufacturing" ("CAD/CAM"). Similarly, it is an essential element of a third technology called "computer-aided engineering" ("CAE"). These technologies make possible the presentation on a display device of documents such as engineering drawings, exploded-parts illustrations for service manuals, and business graphs. One of the most useful and valuable aspects of computer graphics is the improvement which allows interaction between the viewer of a displayed image and the image itself. In so-called "interactive computer graphics," the viewer of a displayed image may propose or experimentally make modifications of the displayed image and observe the functional effects of the proposed modifications of the object or document displayed. In order for the aforementioned technologies to be of maximum value, the image shown on the display device should be portrayed in full color.

In the art of computer graphics, there are many available types of display devices. In interactive computer graphics, the most commonly used type of display is the color cathode-ray tube—a highly-developed and well-understood device. The cathode-ray tube is an analog device. That is to say, the position and intensity of each illuminated spot formed on the face of the tube by its electron beam are continuous functions of the respective voltages applied to the deflecting plates and the "electron guns," (usually one for each primary color) of the cathode-ray tube. By contrast, the computer circuitry which furnishes to the cathode-ray tube the data necessary to define each illuminated spot is digital in nature rather than continuous.

When a cathode-ray tube is used in random-scan fashion, a straight line can be drawn on the face of the tube directly from any "addressable" point to any other addressable point on the face of the tube. On the other hand, when a cathode-ray tube is used as the output or display device of a computer-graphics apparatus, it is generally not possible to connect directly any two arbitrarily chosen points on the face of the tube by a straight line having no irregularities. In computer graphics, wherein the display is "rasterized," the face of the cathode-ray tube can be regarded as a matrix of discrete picture elements, or "pixels," each of which can be activated or made bright when it is energized by the electron beam of the cathode-ray tube. Except in certain circumstances, one cannot draw a perfectly straight line from one arbitrary addressable point on the face of the tube to another arbitrary addressable point on the face of the tube. Rather, it is possible only to approximate a straight line by activating a series of pixels as close as possible to the desired path of the line on the face of the tube. Only in the special cases of lines which are horizontal or vertical, or which have a slope with an absolute magnitude of unity, will the activated pixels form the perfectly straight line that is desired. In all other cases, the line which is approximated by a process of "rasterization" will have some degree of irregularity and will only approach—as closely as possible—the desired straight line. This undesired irregularity or stair-step effect is called "aliasing."

Most commonly, the data necessary to implement a rasterized display on a cathode-ray tube are assembled in a device called a "frame buffer." A frame buffer is a large contiguous piece of computer memory. At a minimum, there must be one memory bit in the frame buffer for each pixel of the rasterized image desired to be displayed on the face of the cathode-ray tube. This quantity of memory is called a "bit plane." If the frame buffer contains a single bit plane, the data for the desired image are assembled in the frame buffer one bit at a time. If the display is to be in color, there must be more than one bit plane, and one bit of data can be assembled in each such bit plane at a time.

Before the data stored in the bit planes of the frame buffer can be inputted to the cathode-ray tube, the data must be converted from digital to analog form. This conversion is accomplished by a "digital-to-analog converter" ("DAC"). Each bit of pixel data in the frame buffer must be accessed and converted to analog form before it can appear in the raster on the face of the cathode-ray tube. When color data for the pixels of the display are stored in a plurality of bit planes of the frame buffer, a limited amount of information on the intensities of the respective primary colors is available. The utility of this information can be increased somewhat by feeding the output from the bit planes to "color-look-up tables" having an entry index for each memory element of the respective bit planes of the frame buffer. By means of such color-look-up tables, it is possible to augment the color data received from the bit planes of the frame buffer and to provide the augmented data to the digital-to-analog-converters to be in turn furnished to the respective "color electron guns" of the color-cathode-ray tube in the display device.

In preparing to draw a line in the display, the color data for the pixels which are to be activated must be stored at appropriate addresses in the frame buffer. This is sometimes done by computing and storing the X and Y coordinates of the selected pixels which most nearly approximate the straight line that is desired. Of course, the pixels so selected will in each case depart from the desired straight line by a distance known as the "error." The addresses of the pixels to be activated are furnished to the frame buffer by a "pixel memory controller," which includes or cooperates with a microprocessor that may be in the controller or may be shared with the host computer.

In line-drawing apparatus of the prior art, the microprocessor has computed successive X and Y coordinates for the pixels to be activated. This computation has been carried out by incrementing either the X or Y coordinate by one unit and by determining a "delta value" by which the other coordinate must be adjusted to correspond to the unit incrementation of the first-mentioned coordinate. If the absolute magnitude of the slope of the line to be drawn is less than unity, a prior-art line-drawing apparatus would increment the X coordinate by one unit and then compute the delta value of the Y coordinate, which would be an amount less than unity. On the other hand, if the absolute magnitude of the slope of the line to be drawn is greater than unity, the apparatus would increment the Y coordinate by one unit and would then compute the delta value for the X coordinate which, again, would be an amount less than unity. It was necessary for the microprocessor in prior-art line-drawing apparatus to choose one of the two aforementioned approaches to the computation of the address for each pixel to be successively activated. This choice required "condition testing" by the microprocessor in accordance with the magnitude of the error term. The instructions for such condition testing and for computation of the addresses of successive pixels to be activated were stored in a program memory. A prior-art program for this purpose was developed by J. E. Bresenham and published in an article entitled, "Algorithm for Computer Control of a Digital Plotter," appearing in the *IBM System Journal,* Vol. 4, Pp. 25–30 in 1965. The so-called "Bresenham Algorithm" has been a very important program in the development of computer-graphics systems. It has undergone a number of modifications to generalize it and to permit the drawing and display of lines having slopes of various magnitudes in any of the eight octants of a Cartesian coordinate system. The instructions to the microprocessor for incrementation and iteration of successive pixel addresses to approximate the desired line may be abbreviated and stated in "program language." A statement of the abbreviated "line-rendering loop" for the first octant as adapted from Bresenham is as follows:

The line end points are $(x_1, y_1)$, and $(x_2, Y_2)$, assumed not equal.
x, y, Del x, Del y are assumed integer.
e is the error term, assumed real.
initialize variables
$x = x_1$
$y = y_1$
Del $x = x_2 - x_1$
Del $y = y_2 - y_1$
initialize e to compensate for a non-zero intercept
$e = $ Del y/Del $x - \frac{1}{2}$
begin the main loop
for i = 1 to Del x
Plot (x, y)
while ($e \geq o$)
$y = y + 1$
$e = e - 1$
end while
$x = x + 1$
$e = e + $ Del y/Del x
next i
finish A flow chart illustrating the implementation of the Bresenham Algorithm appears on page 37 of a book by David F. Rogers entitled *Procedural Elements for Computer Graphics,* published by McGraw Hill, Inc. in 1985.

Reference to both the "line-rendering loop" set forth above and the flow chart of the Bresenham Algorithm reveals that the microprocessor must perform a step of "condition testing" in which the result of the test depends upon the magnitude of the error term. This condition testing results in so-called "branching inside the loop" of the instructions given to the microprocessor for iteration of the computation of the addresses for successive pixels to be activated in drawing the line in the display. Such condition testing and branching within the loop are very expensive in time of operation of the microprocessor. If the time of operation of the microprocessor is measured in terms of cycles of the "clock" which "strobes" it, each iteration of the loop of the Bresenham Algorithm in the microprocessor may require as many as ten cycles of the clock. In computer graphics, the resolution which can be achieved in the drawing of lines depends inversely on the time required for each operation in the rasterization of the pixels to be activated. Ten cycles of the clock is an undesirably long time for one iteration of the "rendering loop" of the algorithm for computing the address of each pixel of the computer-graphics display. This excessive time element has until now been a limiting factor in the development of the art of computer graphics.

OBJECTS OF THE INVENTION

The condition testing and branching required by the execution of algorithms of the Bresenham type have become an obstacle to improvement of resolution of the image that can be obtained in computer-graphics displays. Accordingly, it is a basic object of this invention to eliminate the necessity for condition testing and branching within the loop that is to be iterated in the computation of addresses for successive pixels of each line to be drawn for display.

It is a primary object of this invention to reduce substantially the time required by the microprocessor in computing the addresses for successive pixels to be stored in the frame buffer under the control of the pixel-memory controller.

It is another object of this invention to take advantage of recent developments in the field of microprocessors in order to improve the performance of graphics-controller circuit boards coupled to computers.

It is a further object of this invention to provide a pixel-memory controller a microprocessor, and a set of instructions for said microprocessor such that the speed of operation of the computer-graphics apparatus is not limited by the speed of the microprocessor or by the instructions for the microprocessor or by the portion of the pixel-memory controller for the color intensities of the pixels to be activated in order to draw each desired line.

SUMMARY OF THE INVENTION

Briefly, we have fulfilled the above-mentioned and other objects of our invention by providing a method and apparatus in which the X and Y coordinates of each pixel selected for activation are represented in so-called "floating-point format" by the microprocessor. One of the X or Y coordinates is represented in integer form, while the other of the X or Y coordinates is represented in the form of an integer plus a fraction. The choice of which of the X or Y coordinates is represented in integer form and which is represented in the form of an integer plus a fraction depends upon the absolute magnitude of the slope of the line to be drawn.

Also represented in floating-point format are "delta values" for the X, Y, and fractional components of the incrementation of the address of the pixel most recently activated to compute the address of the next pixel. The sum of the floating-point numbers representing respectively the addresses of the pixel most recently activated and the "delta values" in going from the aforementioned pixel to the address of the pixel next to be activated is again a floating-point number representing the total address of the pixel next to be activated. This summation of numbers for addresses in floating-point format can be performed by a microprocessor such as the TMS320C30 microprocessor marketed by Texas Instruments Inc. of Dallas, Tex.

As aforementioned, the choice of which of the X or Y coordinates of the pixel is incremented by unity and which is augmented by a fraction is a function of the absolute magnitude of the slope of the line to be drawn. The selection between the coordinate which is to be incremented by unity and the coordinate which is to be augmented fractionally changes from time to time in accordance with the slope of the line to be drawn. The status of the selection at any given time is indicated by a one-bit register which is a component part of the pixel-memory controller.

The input to the pixel-memory controller is a single number in integer format. The address for each pixel comprises 11 bits of data specifying the X or Y coordinate of the pixel next to be activated and 11 bits of the Y or X data for the same pixel. The 11 bits of data from the "Y or X" portion are combined with the 11 bits from the "X or Y" portion in a pair of multiplexers which function in accordance with a "flag" or signal from the aforementioned one-bit register that indicates which coordinate is incremented by unity and which coordinate is augmented fractionally. The combined output of the two multiplexers is the address of the pixel next to be activated, ready for entry in the frame buffer.

The advances which are being summarily stated herein are as follows:

1. We have introduced a microprocessor which is capable of handling data in both integer and floating-point format;
2. We have taken advantage of this floating-point capability to increment and augment the address of each pixel in floating-point format;
3. We have chosen to include in the updating delta value a fractional component for only one of the X or Y coordinates, depending on the absolute magnitude of the slope of the line to be drawn;
4. We have provided a register for recording and indicating which of the coordinates is incremented by unity and which is augmented by a fractional amount;
5. We have provided means for reconverting the data in floating-point format to data in integer format for entry into the frame buffer; and
6. By avoiding the condition testing and branching within the main loop of the instructions given to the microprocessor, we have reduced the processing time from ten cycles per iteration to three cycles per iteration. Thus, the speed of operation of the microprocessor has been more than tripled. The microprocessor and the pixel-memory controller no longer limit the speed of processing of pixel data or its resolution. It appears that any limit upon speed of processing and upon resolution is now imposed by the rate of transfer of data from the pixel-memory controller to the frame buffer.

BRIEF DESCRIPTION OF THE DRAWINGS

The invention summarized above will be described in detail in the following specification. The specification will be best understood if read while referring to the accompanying drawings, in which:

FIG. 1 is a block diagram of the entire line-drawing apparatus in accordance with this invention;

FIG. 2 is a detailed representation of the pixel-memory controller, which is one of the important "blocks" of FIG. 1;

FIG. 3 is a representation in "program language" of the "line-rendering loop" which was one of the principal instructions given by the program memory controller to the microprocessor in line-drawing apparatus of the prior art, following the teachings of Bresenham;

FIG. 4 is a representation, also in program language, of the corresponding line-rendering loop which is the iterative portion of the instructions given by the program memory controller to the microprocessor in the line-drawing apparatus according to this invention;

FIG. 5 is a representation of the single X and Y integer coordinate computed by the microprocessor for the address of the pixel to be processed by the pixel-memory controller;

FIG. 6 is a schematic representation of the addition by the microprocessor of a floating-point number representing the coordinates of the last-activated pixel and another floating-point number representing the corresponding delta functions necessary to augment the existing coordinates to obtain the coordinates of the next pixel to be activated. The schematic representation of FIG. 6 is for the case in which the absolute magnitude of the slope of the line to be drawn is less than unity; and FIG. 7 is a schematic representation of the corresponding addition of floating-point numbers to augment the coordinates of the last-activated pixel by the delta functions to obtain the coordinates of the next pixel to be activated, this representation being for the case in which the absolute magnitude of the slope of the line to be drawn is greater than unity.

DESCRIPTION OF THE PREFERRED EMBODIMENT

Turning to the block diagram of FIG. 1, there is a microprocessor 11 which computes the "address" of each pixel in floating-point format. In order to be able to process floating-point numbers internally, the microprocessor should be of a type such as the Texas Instruments Model TMS320C30, which has improved capability over its predecessors for the processing of numbers in floating-point format. The instructions for computation of the address by microprocessor 11 are stored in a program memory 13, which is coupled to microprocessor 11. Program memory 13 may be, but need not necessarily be, of the static-random-access-memory type ("SRAM").

Microprocessor 11 computes the address of each pixel in accordance with the instructions given by program memory 13 and forwards such address, together with data on the color of the pixel to be activated, to a pixel-memory controller 15, which includes principally a solid-state gate array. In pixel-memory controller 15, the X-and-Y-coordinate-address data for the pixel are stored in a first address register 17 and a second address register 19, as shown in FIG. 2 of the drawings, which is a detailed representation of pixel-memory controller 15. The outputs of first address register 17 and second address register 19 are combined in a multiplexer 21. The functioning of multiplexer 21 depends upon the absolute magnitude of the slope of the line to be drawn, i.e. whether such absolute magnitude is greater or less than unity. The status of the functioning of multiplexer 21 is indicated by an XY-swap flag register 23, which is also a part of pixel-memory controller 15. XY-swap flag register 23 may be a register of one-bit capacity that indicates which of two conditions prevails in multiplexer 21.

The output of multiplexer 21, in the form of discrete integer numbers, goes to a frame buffer 25 for storage and assembly into a bit plane in a manner which has been explained in the introductory paragraphs of this specification. The data stored in frame buffer 25 are accessed, one pixel at a time, and are fed to a color-look-up table 27 in which the color representation of the bit-plane data is enhanced. Frame buffer 25 is a pixel memory which may be assembled from memory chips wired together to aggregate the required memory capacity. We have found that the required capacity is generally between one-half megabyte and two megabytes of memory. For this purpose, we prefer to employ between four and sixteen identical units of video random-access memory ("VRAM"), permanently installed on the apparatus circuit board. It will be understood that the amount and type of memory capacity may be chosen to fulfill the requirements of individual users.

The output of color-look-up table 27 goes to a digital-to-analog converter 29, which may comprise three sections. Each of these sections processes digital data representing one of the three primary colors—red, green, and blue—for the line to be drawn. The respective outputs of the three converter sections, in turn, go to the three electron guns of a cathode-ray tube 31, one gun for each of the aforementioned primary colors.

In implementing color-look-up table 27 and digital-to-analog converter 29, we prefer to employ device Model BT-474, marketed by Brooktree Corporation of San Diego, Calif. This device includes color-look-up tables and digital-to-analog converters for all three primary colors, integrated on a single "chip".

In addition to the inputs that frame buffer 25 receives from pixel memory controller 15, frame buffer 25 also receives pixel-memory data from a "pixel-data manager" 33, which is a gate array connected to the address and data lines from microprocessor 11 as well as to frame buffer 25. The gate array which we prefer to use in pixel-data manager 33 is Model XC 3030, marketed by Xilinx, Inc., of San Jose, Calif. This is a single-chip device which is adapted to receive address and control signals from microprocessor 11. It also exchanges data with microprocessor 11 (through a bus at least 32 bits wide), and exchanges pixel-memory data with frame buffer 25.

Returning to the discussion of program memory 13, the instructions given by program memory 13 to microprocessor 11, when written in "program language," are as shown in FIG. 4 of the drawings. FIG. 4 represents the "line-rendering loop" of the program which is stored in program memory 13. The line-rendering loop constitutes the substantive part of the program, which is iterated from pixel to pixel in drawing the line on the face of the cathode-ray tube. It does not include preliminary considerations such as the "initialization" of the coordinates of the pixels to be activated. It is noteworthy that the instructions contained in the line-rendering loop illustrated in FIG. 4 do not include any condition-testing or branching steps as do those of the prior art illustrated in FIG. 3. In the instructions given by program memory 13 to microprocessor 11, there is no need to make any distinction between the case of an error greater than zero and the case of an error equal to or less than zero. Nor does the microprocessor have to distinguish between the respective cases of line slopes having an absolute magnitude less than unity and line slopes having an absolute magnitude greater than unity. That distinction is still made, as indeed it must be, but is taken care of in pixel-memory controller 15, rather than in microprocessor 11. This relieves the burden upon microprocessor 11, which until the time of this invention has been the limiting factor in the speed of computing and rendering a line in computer graphics.

As aforementioned, the line-rendering loop illustrated in FIG. 4 of the drawings does not include any condition-testing or branching steps within the loop. The processing of the line-rendering loop of FIG. 4 by microprocessor 11 in the form of Texas Instruments Model TMS320C30 requires only three cycles as measured by the "clock" that "strobes" microprocessor 11. This remarkable speed performance is attributable partly to the new availability of microprocessor devices capable of "on-chip" handling of floating-point arithmetic. More importantly, it is attributable to an election, in accordance with this invention, to handle matters of line slope in pixel-memory controller 15, rather than further burdening the capabilities of the microprocessor.

For the sake of contrast, one should note the line-rendering loop which would have been required in the instructions given by the program memory to the microprocessor in accordance with the practice of the prior art following the teachings of Bresenham. His line-rendering loop includes branching depending upon whether the error, i.e., the departure from the desired line, is greater or less than zero. This branching determination reduces to a question whether the error is greater or less than a certain threshold value. This invention relieves the microprocessor of the "responsibility," and the consequent time burden, of resolving the matters of "error" engendered by the slope of the line to be plotted. This result is accomplished by providing a pixel-memory controller 15 and by redistributing the burden as between microprocessor 11 and pixel-memory controller 15. Thus, our invention has reduced the time required for iterating a one-pixel step in a line-rendering loop from ten cycles of the system clock to three cycles of that clock. This innovation represents a better-than-three-fold improvement in the speed performance of the system. The benefit of the improvement in speed is reflected in a corresponding improvement in resolution of the display.

The following instructions are given by program memory 13 to microprocessor 11, as abbreviated in FIG. 4 of the drawings:

For i=0 to N do;
Draw_Pixel (I coordinate, Color);
F coordinate=F coordinate+Del F coordinate;
I coordinate=FIX (F coordinate);
End;
Wherein:
(A) I coordinate is the integer coordinate of the pixel being rendered;
(B) F coordinate is I coordinate in floating-point format;
(C) Del F coordinate is the floating-point delta value needed to compute the address of the next pixel;
(D) Color is the color (hue) to be used in the pixel;
(E) Draw_Pixel draws a pixel at I coordinate using Color; and
(F) FIX converts a floating-point value to integer format.

The instructions based upon the above-listed definitions and stored in program memory 13 to be furnished to microprocessor 11 may assume a memory-address space having dimensions of SCREEN_X and SCREEN_Y in the X and Y directions respectively. Both the SCREEN_X and SCREEN_Y dimensions must be powers of two. In that way, the pixel memory stored in program memory 13 constitutes a two-dimensional array having SCREEN_Y rows and SCREEN_X columns. In accordance with that assumption of a matrix of SCREEN_X columns and SCREEN_Y rows, each pixel represented by the matrix can be addressed in a manner defined by the following relationship:

$$I\ coordinate = X\ coordinate + SCREEN\_X * Y\ coordinate.$$

It will be understood that the "star" symbol indicates the operation of multiplication. Assuming again that SCREEN_X and SCREEN_Y are powers of two, then, in accordance with the relationship just stated, I coordinate is representable in the form shown in FIG. 5 of the drawings. The designations of X coordinate and Y coordinate are interchangeable, and the selection made in FIG. 5 is arbitrary. In any event, the address data produced by microprocessor 11 pursuant to the instructions from program memory 13 take the form of a single number representable as in FIG. 5, whichever positions may have been arbitrarily chosen for the two coordinates. We prefer that X coordinate be represented by 11 bits of address data and that Y coordinate likewise be represented by 11 bits of address data. The Texas Instruments microprocessor Model TMS320C30, suggested for use as microprocessor 11, has 32-bit data capability and 24-bit address capability. Of the 24-bit address capability, 22 bits are required for the X and Y addresses. Two bits are used for control purposes by frame buffer 25 in decoding pixel-memory addresses, as shown in FIG. 1 of the drawings.

From any given pixel on a line to be drawn, the address of the next pixel to be activated can be computed by the following linear relationships:

$$X\ coordinate(n+1) = X\ coordinate(n) + Del\ X\ coordinate;\ and$$

$$Y\ coordinate(n+1) = Y\ coordinate(n) + Del\ Y\ coordinate.$$

If the positions of N pixels are to be plotted along a desired line from $X_1, Y_1$, to $X_2, Y_2$, there is a restriction that N is equal to the greater of the magnitudes of the difference $(X_2-X_1)$ and the difference $(Y_2-Y_1)$. Similarly, the value of the Del X coordinate is equal to $(X_2-X_1)$ divided by N, and the value of the Del Y coordinate is equal to $(Y_2-Y_1)$ divided by N.

So long as the pixel-address space permitted by microprocessor 11 is sufficient, the Del XY address can be added to the XY address to obtain the next value of the XY address without one coordinate value overflowing into the other coordinate value in the output of microprocessor 11. However, even with the advent of the Texas Instruments Model TMS320C30 microprocessor, the available pixel-address space is not sufficient to allow the entry of integer numbers for X and Y coordinates and also for delta values for both coordinates. Entry of integer coordinates for X and Y and for delta values for both X and Y would, unfortunately, cause an overflow of the available pixel-address space.

This invention overcomes the limitation of available pixel-address space, even in the most-advanced microprocessors, by electing to increment one chosen coordinate as an integer and by electing to augment the other coordinate (X or Y as the case may be) with a fraction which can be represented within the available pixel-address space. According to this invention, the limitation on available pixel-address space in even the most-advanced microprocessors is overcome by augmenting one of the two X or Y coordinates by a fraction while incrementing the other coordinate only by unity. Furthermore, and still more importantly, the X and Y coordinates and their delta values are converted to floating-point format within microprocessor 11, as permitted by the capabilities of Texas Instruments Model TMS320C30. By allowing a fractional delta value for only one of the X or Y coordinates, but not both, and, further, by converting the pixel address into floating-point format, this invention permits the arithmetic operations necessary for updating pixel addresses to be performed in floating-point format, for later conversion back to integer format.

When the absolute magnitude of the slope of the line to be drawn is less than unity, the updating of the X and Y coordinates (in which only the Y coordinate is updated by a fractional amount) is represented schematically in FIG. 6 of the drawings. When the absolute magnitude of the slope of the line to be drawn is less than unity, the preferred approach is to increment the X coordinate by unity and to augment the Y coordinate by an appropriate fractional amount less than unity.

When the absolute magnitude of the slope of the line to be drawn is greater than unity, the preferred approach in accordance with this invention is to increment the Y coordinate by unity, while augmenting the X coordinate by an appropriate fractional amount. Again, so long as the Y coordinate is incremented only by an integer whereas fractional augmentation of the X coordinate is allowed, the incrementation and augmentation operations can be contained within the bit width allotted to computing the address of the next pixel. This operation is illustrated in FIG. 7 of the drawings.

As the plotting of the addresses of the pixels constituting a line display continues, the absolute magnitude of the slopes of respective line segments may change from less than unity to greater than unity, and vice versa. When such changes take place, the operation of pixel-memory controller 15 must reflect them. The changes are sensed by multiplexer 21 and registered in XY-swap flag register 23. As previously noted, XY-swap flag register 23 is a one-bit register which indicates whether the absolute magnitude of the slope of the line to be drawn is greater than or less than unity.

This invention makes possible the computation of pixel addresses in floating-point format in less than one-third the time required by prior-art methods and apparatus. The invention makes optimum use of the address space of newly available hardware by limiting the fractional augmentations of the respective coordinates to one only of the X and Y coordinates of the pixels whose addresses are to be computed. This procedure is implemented by incrementing and augmenting the X and Y coordinates of the pixels to be activated by amounts which depend upon the slope of the line to be drawn. The invention provides flag-register means for indicating which of the X and Y coordinates is being incremented by unity and which is being augmented by a fractional amount, depending on the absolute magnitude of the slope of the line to be drawn and displayed.

The most useful known embodiment of the method and apparatus in accordance with the present invention has been fully described in the foregoing specification. However, variations will undoubtedly occur to readers of this specification. Accordingly, the following claims define the scope of this invention which, with its equivalents, is covered hereby.

What we claim as new and desire to secure by Letters Patent of the United States is as follows:

1. In a computer-graphics system wherein a series of colored pixels are to be plotted to represent a line having a predetermined magnitude of slope on a display device, each of said series of colored pixels having a horizontal X coordinate and a vertical Y coordinate, together constituting the address of said pixel, said system operating in a first mode if said magnitude of the slope of said line is less than unity whereby an increment of the vertical Y coordinate in going from one pixel to the next of said series is smaller than the increment of the horizontal X coordinate in going from one pixel to the next of said series, and said system operating in a second mode if said magnitude of the slope of said line is greater than unity whereby an increment of the vertical Y coordinate in going from one pixel to the next of said series is greater than the increment of the horizontal X coordinate in going from one pixel to the next of said series, the apparatus comprising:
   (a) a microprocessor for:
      (1) computing the address of a first pixel of said series, said address in said first mode including, in floating-point form, an X coordinate, a Y coordinate, and a fractional Y component,
      (2) computing a delta value including, in floating-point form, a delta X component, a delta Y component, and a fractional delta Y component,
      (3) adding said address and said delta value to produce a first sum in floating-point form, and
      (4) converting said sum into integer form having X and Y components,
   (b) a program memory for giving instructions to said microprocessor for making said computations and said conversion,
   (c) a pixel-memory controller having first and second storage elements for said X and Y components respectively, a multiplexer for combining said X and Y components to produce, in digital form, an address for a second pixel of said series, said pixel-memory controller also having register means for storing an indication of said mode of operation,
   (d) a frame buffer for receiving from said multiplexer and storing said address for said second pixel in digital form,
   (e) a color-look-up table for translating said address for said second pixel into color data in digital form, and
   (f) means for converting said color data into analog form for driving said display device.

2. Apparatus in accordance with claim 1, further including pixel-data-manager means for receiving control and pixel-address data from said microprocessor and for providing pixel-memory data to said frame buffer.

3. Apparatus in accordance with claim 1, further including a cathode-ray tube for receiving analog data from said means for converting said color data into analog form for driving said display device.

4. In a computer-graphics system wherein a series of colored pixels are to be plotted to represent a line having a predetermined magnitude of slope on a display device, each of said series of colored pixels having a horizontal X coordinate and a vertical Y coordinate, together constituting the address of said pixel, said system operating in a first mode if said magnitude of the slope of said line is less than unity whereby an increment of the vertical Y coordinate in going from one pixel to the next of said series is smaller than the increment of the horizontal X coordinate in going from one pixel to the next of said series, and said system operating in a second mode if said magnitude of the slope of said line is greater than unity whereby an increment of the vertical Y coordinate in going from one pixel to the next of said series is greater than the increment of the horizontal X coordinate in going from one pixel to the next of said series, the apparatus comprising:
   (a) a microprocessor for:
      (1) computing the address of a first pixel of said series, said address in said second mode including, in floating-point form, a Y coordinate, an X coordinate, and a fractional X component,
      (2) computing a delta value including, in floating-point form, a delta Y component, a delta X component, and a fractional delta X component,
      (3) adding said address and said delta value to produce a first sum in floating-point form, and
      (4) converting said sum into integer form having X and Y components,
   (b) a program memory for giving instructions to said microprocessor for making said computations and said conversion,
   (c) a pixel-memory controller having first and second storage elements for said X and Y components respectively, a multiplexer for combining said X and Y components to produce, in digital form, an address for a second pixel of said series, said pixel-memory controller also having register means for storing an indication of said mode of operation,
   (d) a frame buffer for receiving from said multiplexer and storing said address for said second pixel in digital form,
   (e) a color-look-up table for translating said address for said second pixel into color data in digital form, and
   (f) means for converting said color data into analog form for driving said display device.

5. Apparatus in accordance with claim 4, further including pixel-data-manager means for receiving control and pixel-address data from said microprocessor and for providing pixel-memory data to said frame buffer.

6. Apparatus in accordance with claim 4, further including a cathode-ray tube for receiving analog data from said means for converting said color data into analog form for driving said display device.

* * * * *